US005406036A

United States Patent [19]

Haug

[11] Patent Number: 5,406,036

[45] Date of Patent: Apr. 11, 1995

[54] FRANKING MACHINE

[75] Inventor: Werner Haug, Langnau, Switzerland

[73] Assignee: Frama AG, Lauperswil, Switzerland

[21] Appl. No.: 22,143

[22] Filed: Feb. 25, 1993

[30] Foreign Application Priority Data

Mar. 10, 1992 [CH] Switzerland ........................... 756/92

[51] Int. Cl.[6] ........................ G01G 19/40; G06G 7/48

[52] U.S. Cl. .............................. 177/25.15; 364/464.03

[58] Field of Search ................ 177/25.15; 364/464.02, 364/464.03

[56] References Cited

U.S. PATENT DOCUMENTS 4,084,242 4/1978 Conti ............................ 177/25.15 X
4,138,735 2/1979 Allocca et al. ............. 177/25.15 X

*Primary Examiner*—George H. Miller, Jr.
*Attorney, Agent, or Firm*—Ladas & Parry

[57] ABSTRACT

For modifying the content of a postage rate memory of a franking machine (1) with weight input, which contains the relationship between the weight and the franking value, a loading plug (9) is provided, which for this purpose is plugged into an interface socket (7) of the franking machine. Through the operation of instruction inputting means of the franking machine the content of a memory enclosed in the loading plug (9) can be loaded into the postage rate memory of the franking machine (1). On changing the postage rates the loading plug (9) is sent to the user, so that the latter can update the content of the franking machine postage rate memory, without it being necessary for an authorized person to open the lead-sealed casing of the franking machine (1).

3 Claims, 2 Drawing Sheets

FIG. 1
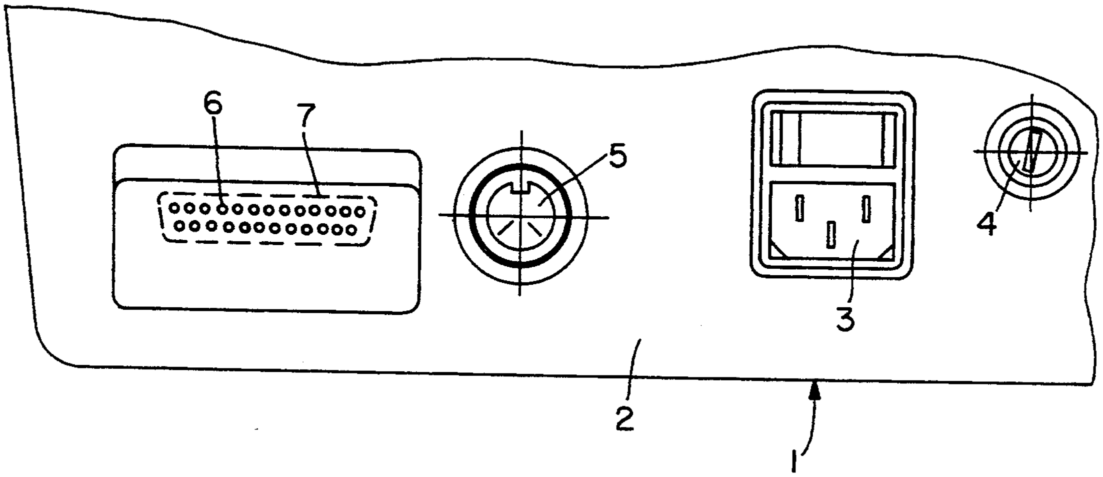
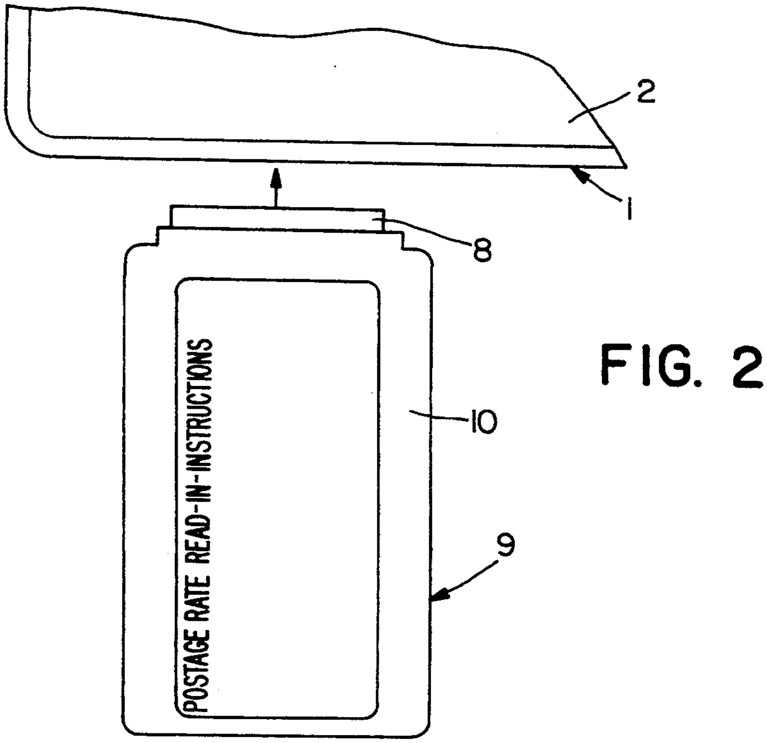
FIG. 2

FRANKING MACHINE

BACKGROUND OF THE INVENTION

The invention relates to a franking machine with an electronic control unit for the control of a device for setting franking values on its printing head and an input keyboard for inputting weight values or weight ranges, the control unit having a computer and a memory (PROM) for postage rates, so that the weight inputs are converted into franking values for the automatic setting of the printing head by the computer.

A franking machine of this type is described in EP-A-387 202. For franking value setting on the basis of a weight input, the electronic device enclosed in the sealed casing is equipped with a memory containing the postage rates. Therefore in the case of such a franking machine there is no need to input the franking values by means of a keyboard and it is sufficient in place of this to merely input by means of the keyboard the weight or the weight step (up to 20 g, up to 50 g, up to 100 g, etc.) or to connect an external, electronic balance.

When the postage rates are changed, i.e. when the relationship between the rate and the franking value is modified, it is necessary to call in an authorized fitter and, by opening the lead-sealed casing, to replace the postage rate memory by a new one.

SUMMARY OF THE INVENTION

The problem of the invention is to simplify the equipping of the franking machine with a memory containing the valid postage rates and avoid the calling in of an authorized fitter. According to the invention this problem is solved in that the outside of the franking machine has an interface plug socket for the connection of an electronic device for reading new postage rates into the franking machine memory. For this purpose is also provided a loading plug for reading postage rates into the franking machine memory by means of an interface, said machine having a programmable and erasable memory (EPROM) enclosed in a casing for receiving the in each case valid postage rates and on the casing pins are provided for coupling to the interface plug socket of the franking machine. Thus, the solution according to the invention has the advantage that the new postage rates can be introduced in simple manner into the franking machine by the user, in that they are sent to him by the post office or the manufacturer with the said device. Following loading he can then return the loading plug, so that it can then be sent to other franking machine users for loading the new postage rates.

DESCRIPTION OF THE DRAWINGS

The invention is described in greater detail hereinafter relative to the drawings, wherein show:

FIG. 1 A side view of a franking machine casing area.

FIG. 2 A plan view of a loading plug with the adjacent franking machine casing part.

DETAILED DESCRIPTION OF PREFERRED EMBODIMENTS

Figure 3:
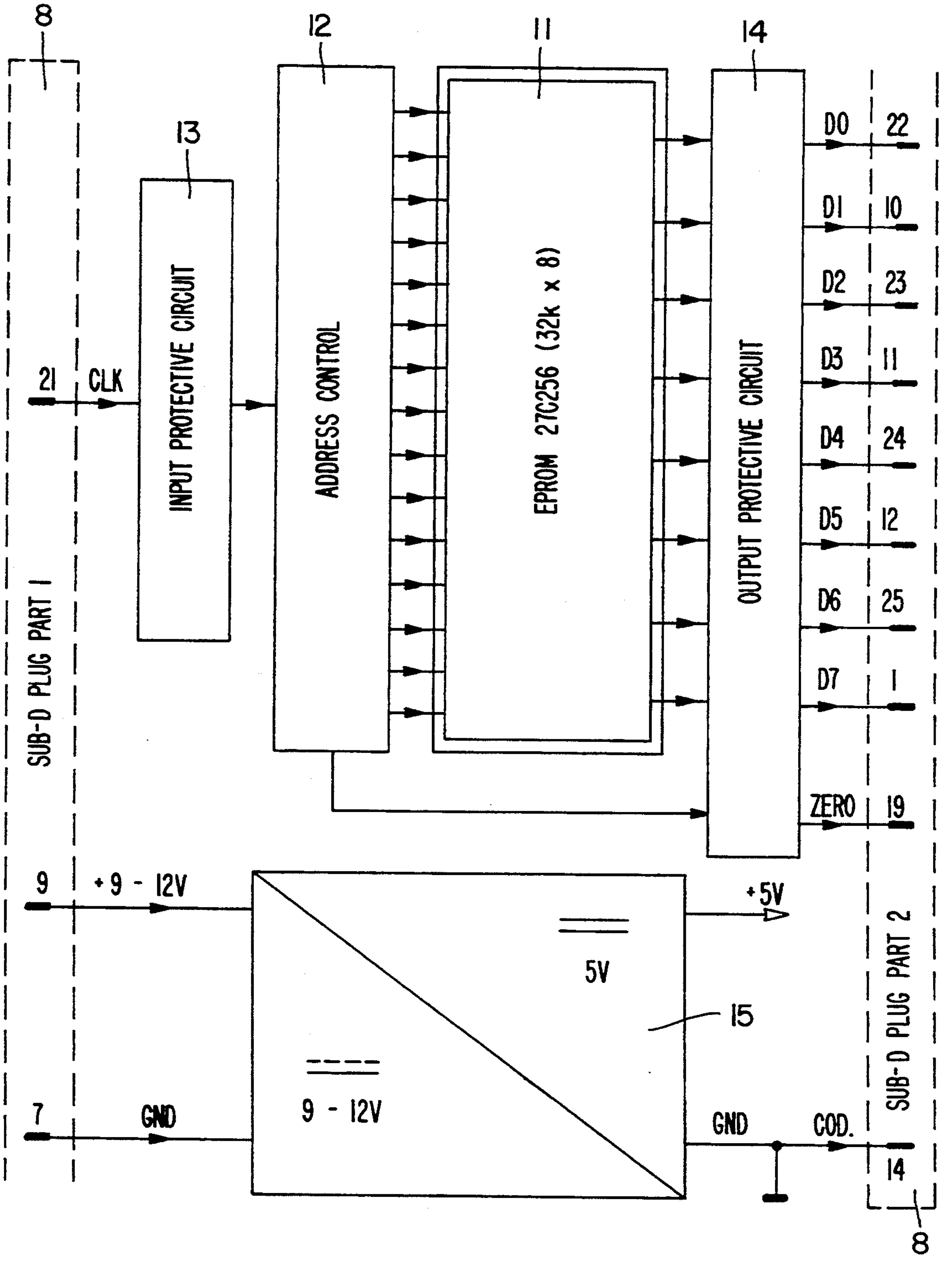
FIG. 3 A diagrammatic representation of the electronic devices in the loading plug.

The franking machine 1 has a casing 2, which so encloses its mechanical and electronic devices that they are not accessible from the outside. It is only possible to open the casing 2 by releasing a not shown lead seal and for which purpose it would be necessary to call in an authorized post office or manufacturing company fitter.

The represented area of the casing 2 of the franking machine 1 shows a plug socket 3 for connection to the electric power supply, an electric fuse 4, a multiple socket 5 for the optional connection of an electronic balance and an interface socket 7 having numerous pin receptacles 6 for the connection of the plug part 8 of the loading plug 9 for loading a memory of the electronic control device of the franking machine 1 with modified postage rates.

The casing 10 of the loading plug 9 encloses a programmable and erasable memory 11 (EPROM), as well as an associated unit 12 for address control, protective circuits 13,14 for input and output and a voltage regulator 15.

The loading plug 9 is plugged into the interface socket 7 for loading the new postage rates. By means of its keyboard the franking machine receives two instructions from the user and as a result the loading process is started. A first instruction is given by a plug-in, color-marked instruction key and the second by an input key, which in normal franking machine operation switches the latter to the weight input mode. A more detailed description of this franking machine, which is not essential for the purposes of the present invention, is provided in CH-A-663 848 (U.S. Pat. No. 4,520,725) and CH-A-678 366 (U.S. Pat. No. 07/490,040).

Written instructions for the loading of the new postage rates appear on the top of the loading plug 9.

what is claimed is:

1. A franking machine comprising:

a sealed case;

a printing head;

a means for inputting weight values or weight ranges;

an electronic control unit disposed inside said sealed case, said electronic control unit including (a) a computer connected to said means for inputting weight values or weight ranges and to said printing head and (b) a programmable memory connected to said computer, said programmable memory storing values of postage rates, whereby input weights or weight ranges are converted into franking values for the automatic setting of the printing head; and an interface receptacle connector disposed on the outside of said sealed case and coupled to said programmable memory, for receiving a connection plug of a portable off-line external electronic loading device for reading new postage rates, previously stored in said loading device, into said programmable memory contained in said sealed case.

2. A portable off-line electronic loading device for reading in postage rates via the interface connector coupled to the programmable memory of the franking machine according to claim 1, comprising:

a device casing; and a programmable and erasable memory (EPROM) enclosed in the device casing for receiving and storing valid postage rates, the device casing being provided with a connector for connecting to the interface connector of the franking machine for transferring the valid postage rates stored in the programmable and erasable memory of the electronic loading device to the programmable memory of the franking machine.

3. A portable off-line electronic loading device for reading in postage rates via an interface connector coupled to a programmable memory of a franking device for calculating franking values on the basis of a weight input, comprising:

a device casing; and a programmable and erasable memory (EPROM) enclosed in the device casing for receiving and storing valid postage rates, the device casing being provided with a connector for connecting to the interface connector of the franking device for transferring the valid postage rates stored in the programmable and erasable memory of the electronic loading device to the programmable memory of the franking device.

* * * * *